United States Patent
Robbins et al.

(10) Patent No.: US 10,097,358 B2
(45) Date of Patent: Oct. 9, 2018

(54) SECURING IOT DEVICES USING AN OUT-OF-BAND BEACON

(71) Applicant: Dell Products, L.P., Round Rock, TX (US)

(72) Inventors: Warren Wade Robbins, Celina, TX (US); Daniel L. Hamlin, Round Rock, TX (US); Charles D. Robison, Buford, GA (US)

(73) Assignee: Dell Products, L.P., Round Rock, TX (US)

( * ) Notice: Subject to any disclaimer, the term of this patent is extended or adjusted under 35 U.S.C. 154(b) by 193 days.

(21) Appl. No.: 15/133,294

(22) Filed: Apr. 20, 2016

(65) Prior Publication Data

US 2017/0310485 A1    Oct. 26, 2017

(51) Int. Cl.
| | |
|---|---|
| H04L 9/32 | (2006.01) |
| H04W 4/06 | (2009.01) |
| H04L 9/30 | (2006.01) |
| H04L 29/06 | (2006.01) |
| H04W 12/06 | (2009.01) |
| H04W 12/04 | (2009.01) |
| H04L 9/00 | (2006.01) |
| H04L 9/14 | (2006.01) |
| H04W 88/16 | (2009.01) |

(52) U.S. Cl.
CPC ............ *H04L 9/3263* (2013.01); *H04L 9/006* (2013.01); *H04L 9/14* (2013.01); *H04L 9/30* (2013.01); *H04L 63/06* (2013.01); *H04L 63/083* (2013.01); *H04W 4/06* (2013.01); *H04W 12/04* (2013.01); *H04W 12/06* (2013.01); *H04L 2209/80* (2013.01); *H04W 88/16* (2013.01)

(58) Field of Classification Search
None
See application file for complete search history.

(56) References Cited

U.S. PATENT DOCUMENTS

| | | | | |
|---|---|---|---|---|
| 9,686,685 | B2* | 6/2017 | Shin | ................. H04W 12/08 |
| 2013/0033118 | A1* | 2/2013 | Karalis | ................. H01F 38/14 |
| | | | | 307/104 |
| 2015/0319171 | A1* | 11/2015 | Robison | ................. H04L 63/08 |
| | | | | 713/171 |
| 2016/0019540 | A1* | 1/2016 | Tsutsui | ................. G06Q 20/327 |
| | | | | 705/71 |

(Continued)

OTHER PUBLICATIONS

Broadcom Corporation, "BCM5880 Cryptographic Module Security Policy, Document Version 1.1", Revision Date: Feb. 2, 2010, 28 Pages.

*Primary Examiner* — Trang T Doan
(74) *Attorney, Agent, or Firm* — Fogarty LLP (57) ABSTRACT

Systems and methods for securing network devices through the use of an out-of-band beacon are described. In some embodiments, a method may include broadcasting, by a gateway, a wireless beacon that is out-of-band with respect to communications between the gateway and a plurality of devices over a network, where the wireless beacon includes a token; receiving an encrypted packet at the gateway as part of the communications; decrypting the encrypted packet into an intermediate payload by the gateway using a public key, where the public key corresponds to a certificate provisioned to each of the plurality of devices; and decrypting the intermediate payload into a decrypted packet by the gateway using the token.

16 Claims, 3 Drawing Sheets

(56) References Cited

U.S. PATENT DOCUMENTS

2016/0155281 A1* 6/2016 O'Toole ............. G07C 9/00182
340/5.64
2016/0234221 A1* 8/2016 Junuzovic ............... H04L 63/08
2017/0171187 A1* 6/2017 Yin ....................... H04L 63/083

* cited by examiner

SECURING IOT DEVICES USING AN OUT-OF-BAND BEACON

FIELD

This disclosure relates generally to Information Handling Systems (IHSs), and more specifically, to systems and methods for securing Internet-of-Things (IoT) devices through the use of an out-of-band beacon.

BACKGROUND

As the value and use of information continues to increase, individuals and businesses seek additional ways to process and store information. An option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

The Internet is a system of interconnected computers and networks that use a standard Internet protocol suite (e.g., the Transmission Control Protocol (TCP) and Internet Protocol (IP)) to communicate with each other. The concept of the "Internet-of-Things" or "IoT" is based on the idea that everyday objects, or "things," and not only conventional IHSs and computers, can be readable, recognizable, locatable, addressable, and/or controllable via a communications network.

For example, in the energy area, utility companies may optimize the delivery of electrical power to homes and businesses by using smart electric meters or the like. In home automation, a smart home or building may provide control over any device within the premises, from large appliances to individual light bulbs. In the area of health and wellness, a healthcare provider may remotely monitor a patient's status. And, in asset tracking, enterprises, hospitals, factories, etc. may accurately track the location of equipment, shipped items, persons, vehicles, and so on.

With the increase in the number of devices that can participate in IoT networks, the inventors hereof have identified a need for increased security measures. At the present time, many participating devices include no (or minimal) security capabilities.

SUMMARY

Embodiments of systems and methods for securing IoT devices through the use of an out-of-band beacon are described herein. In an illustrative, non-limiting embodiment, a method may include broadcasting, by a gateway, a wireless beacon that is out-of-band with respect to communications between the gateway and a plurality of devices over a network, where the wireless beacon includes a token; receiving an encrypted packet at the gateway as part of the communications; decrypting the encrypted packet into an intermediate payload by the gateway using a public key, where the public key corresponds to a certificate provisioned to each of the plurality of devices; and decrypting the intermediate payload into a decrypted packet by the gateway using the token.

In some cases, the communications may include Internet Protocol (IP) communications, and the encrypted packet may include an encrypted IP packet. Transmitting the wireless beacon may include using a Radio Frequency (RF) transceiver that is distinct from another transceiver used in the communications. The wireless beacon may have a range that is shorter than a communication range of the network. And the token may be encrypted by the gateway using the public key prior to the broadcasting of the beacon.

The method may also include: after a selected amount of time, broadcasting, by the gateway, another wireless beacon that is out-of-band with respect to the communications, the other wireless beacon including a different token; receiving another encrypted packet at the gateway as part of the communications; decrypting the other encrypted packet into another intermediate payload by the gateway using the public key; and decrypting the other intermediate payload into another decrypted packet by the gateway using the different token.

The method may further include: after a selected amount of time, broadcasting, by the gateway, another wireless beacon that is out-of-band with respect to the communications, the other wireless beacon including a different token; receiving another encrypted packet at the gateway as part of the communications; decrypting the other encrypted packet into another intermediate payload by the gateway using the public key; and in response to being unable to decrypt the other intermediate payload with the different token, marking a source of the other encrypted packet as suspicious or blocking further communications with the source. The method may also include: transmitting, by the gateway as part of the communications over the network, packets encrypted with both the token and the public key.

In another illustrative, non-limiting embodiment, a device may include a processor; and a memory coupled to the processor, the memory having program instructions stored thereon that, upon execution by the processor, cause the device to: receive a wireless beacon that is out-of-band with respect to communications between a gateway and a plurality of devices over a network, where the wireless beacon includes a token; encrypt an outgoing packet using the token into an intermediate payload; encrypt the intermediate payload into an encrypted packet using a private key, where the private key corresponds to a certificate provisioned to each of the plurality of devices; and transmit the encrypted packet to the gateway over the network.

In yet another illustrative, non-limiting embodiment, a memory device may have program instructions stored thereon that, upon execution by a processor of a gateway, further cause the gateway to: broadcast a wireless beacon that is out-of-band with respect to communications between the gateway and a plurality of devices over a network, where the wireless beacon includes a first token; receive an encrypted packet as part of the communications; decrypt the encrypted packet into an intermediate payload using a public key, where the public key corresponds to a certificate provisioned to each of the plurality of devices; and decrypt the intermediate payload into a decrypted packet using the first token.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

In various embodiments, systems and methods for securing IoT devices through the use of an out-of-band beacon are described herein. Alternative embodiments will be apparent to a person of ordinary skill in the art in light of this disclosure, and may be constructed and practiced without departing from the scope of the disclosure.

For purposes of this disclosure, an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

As used herein, the term "Internet-of-Things device" or "IoT device" may refer to any object or thing (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless network. For example, an IoT device may have a passive communication interface, such as a quick response (QR) code, a radio-frequency identification (RFID) tag, an NFC tag, or the like. Additionally or alternatively, an IoT device may have an active communication interface, such as a modem, network interface card (NIC), an RF transceiver, a transmitter-receiver, or the like.

In some cases, an IoT device may have a particular set of attributes, such as, for example, a state or status, such as whether the IoT device is on or off, open or closed, idle or active, available for task execution or busy, and so on, a cooling or heating function, an environmental monitoring or recording function, a light-emitting function, a sound-emitting function, etc. These attributes may embedded in and/or controlled/monitored by a central processing unit (CPU), microprocessor, Application-Specific Integrated Circuit (ASIC), or the like, and configured for connection to an IoT network such as a local ad-hoc network, a local area network (LAN), and/or the Internet.

For example, IoT devices may include, but are not limited to: refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include conventional types of IHSs, such as cell phones, desktop computers, laptop computers, tablet computers, personal digital assistants (PDAs), etc.

Figure 1:
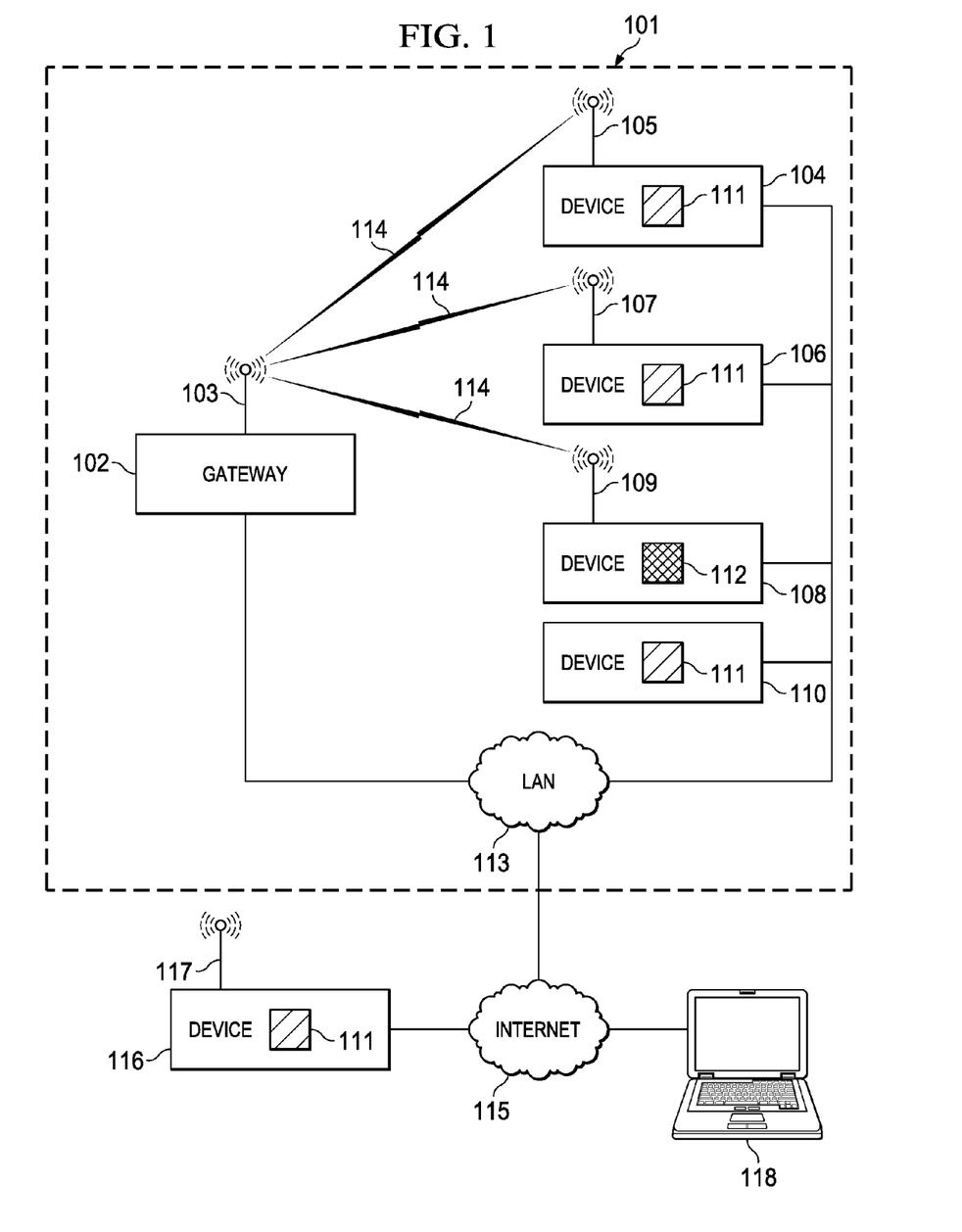
FIG. 1 is a block diagram illustrating an example of an Internet-of-Things (IoT) network that provides security through the use of an out-of-band beacon according to some embodiments.

FIG. 1 is a block diagram showing an example of an Internet-of-Things (IoT) network 100 that provides security through the use of an out-of-band beacon according to some embodiments. As illustrated, premises 101 may be any a limited physical area or space such as, for example, a house, a building, a floor, an office, etc. Premises 101 includes gateway 102 and a plurality of IoT devices 104, 106, 108, and 110 that are installed or located therein.

Gateway 102 may include any system or device (e.g., an IHS) that enables communication with IoT devices 104, 106, 108, and 110 using any suitable communication protocol. For instance, gateway 102 may include protocol and/or signal translators, impedance matchers, rate converters, fault isolators, or the like. Gateway 102 may also include one or more configuration parameters that dictate which of IoT devices 104, 106, 108, and 110 may communicate with each other, for instance.

To this end, gateway 102 and IoT devices 104, 106, 108, and 110 may be in communication with each other via Local Area Network (LAN) 113. LAN 113 may include any communication network—wired or wireless—configured for communication of signals between any of components 102, 104, 106, 108, and 110 of the IOT system.

For example, in various implementations, LAN 113 may include an Ethernet network, a Bluetooth™ network, a Z-Wave™ network, a Wi-Fi™ communication network, a ZigBee™ network, a HomePlug™ network, a Power-line Communication (PLC) network, a message queue telemetry transport (MQTT) network, a MQTT-sensor (MQTT-S) network, a constrained application protocol (CoAP) network, a representative state transfer application protocol interface (REST API) network, an extensible messaging and presence protocol (XMPP) network, a cellular network, any similar communication networks, or any combination thereof for sending and receiving data.

Particularly, communications between gateway 102 and IoT devices 104, 106, 108, and 110 via LAN 113 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with IOT devices.

Independently of LAN 113 and distinct therefrom, an out-of-band communication scheme is also implemented within the IoT network in order to provide systems and methods for securing IoT devices through the use of out-of-band beacon 114. As such, gateway 102 includes out-of-band communication system 103, device 104 includes out-of-band communication system 105, device 106 includes out-of-band communication system 107, device 108 includes out-of-band communication system 109, and device 116, which is outside of premises 101, includes out-of-band communication system 117.

Neither IoT device 110 nor IHS 118 is enabled to perform out-of-band communications, and therefore they do not include a similar out-of-band system as devices 102, 104, 106, or 108. Moreover, in some cases, IoT device 116 and IHS 118 may have potential access to LAN 113 via Internet 115.

To implement systems and methods for securing IoT devices through the use of out-of-band beacon 114, authorized devices may be provisioned with a Public Key Infrastructure (PKI) certificate or the like and/or with a private encryption key corresponding to a public encryption key. In some cases, IoT devices 104, 106, 108, 110, and 116 may each have been provisioned with its respective certificates by its manufacturer or using other trusted methods.

In the example shown in FIG. 1, IoT devices 104, 106, 110, and 116 each include the same certificate 111, whereas device 108 includes a different certificate 112 (or no certificate at all). IHS 118 also lacks certificate 111.

Operation of system 100 is explained in detail with respect to FIGS. 3 and 4, but may be understood generally as follows: in-band (or ordinary) communications take place via LAN 113, while out-of-band beacon 114 provides additional security measures. To that end, gateway 102 transmits out-of-band beacon 114 to any IoT device in its vicinity. The size of the vicinity may be designed or adjusted, for example, by changing the output power of an RF transmitter that is part of out-of-band communication system 103. In this fashion, the range of out-of-band beacon 114 may be controlled so that only IoT devices within a designated area can receive beacon 114.

In this example, the power of out-of-band beacon 114 transmitted by gateway 102 is such that any of IoT devices 104, 106, 108, and 110 within premises 101 can receive that beacon. In contrast, device 116 and IHS 118 are both disposed outside of premises 101, and therefore are outside of the range of out-of-band beacon 114 and cannot receive it.

In various embodiments, out-of-band beacon 114 may include a rotating key or the like, referred to herein as a token. The token is referred to as rotating because it may change according to a policy within gateway 102. For example, the token may be configured to change periodically (e.g., every minute, every hour, every day, etc.) or upon occurrence of a predetermined event (e.g., a detected or suspected breach of the IoT network). Again, the out-of-band beacon 114—and therefore the token—is received only by IoT devices that are equipped with an out-of-band communications system and that are near gateway 102.

The token may be used to encrypt and/or decrypt communications over LAN 113, such that devices outside of premises 101, including device 116 and IHS 118, do not know what the token is. In some cases, the token may itself be encrypted. Gateway 102 may be configured to process only messages or packets encrypted or containing the token, and may either ignore all other messages or packets. Additionally or alternatively, gateway 102, upon receipt of a message or packet that is not encrypted with or does not otherwise contain the token, may activate additional security measures such as, for example, alerting an administrator, blocking access by IoT devices 104, 106, 108, and 110 to Internet 113, etc.

In this example, security measures are such that only IoT devices 104 and 106 can send and receive messages in the IoT network. Although IoT device 110 has been provisioned the correct certificate 110 and is within premises 101, it does not include an out-of-band communication system; therefore it cannot receive out-of-band beacon 114. Although IoT device 108 is equipped with out-of-band communication system 107, is within premises 101, and therefore receives out-of-band beacon 114, it contains an unexpected certificate 112, and therefore cannot decrypt an encrypted token. Similarly, IoT device 116 includes correct certificate 111 and out-of-band communication system 117, but it is outside the range of gateway 102 and does not receive out-of-band beacon 114, and therefore cannot communicate with other devices within premises 101 despite having access to LAN 113 through Internet 115.

In some cases, IHS 118 may be configured to run certain firmware to be installed in an IoT device, for example, for coding or development purposes. Accordingly, in some cases, IHS 118 may be configured to or capable of impersonating an IoT device. However, IHS 118 does not include an out-of-band communication system, does not have the correct certificate, and it is outside the range of gateway 102, therefore it cannot receive the token necessary to participate in communications with devices within premises 101, despite having access to LAN 113 through Internet 115.

Figure 2:
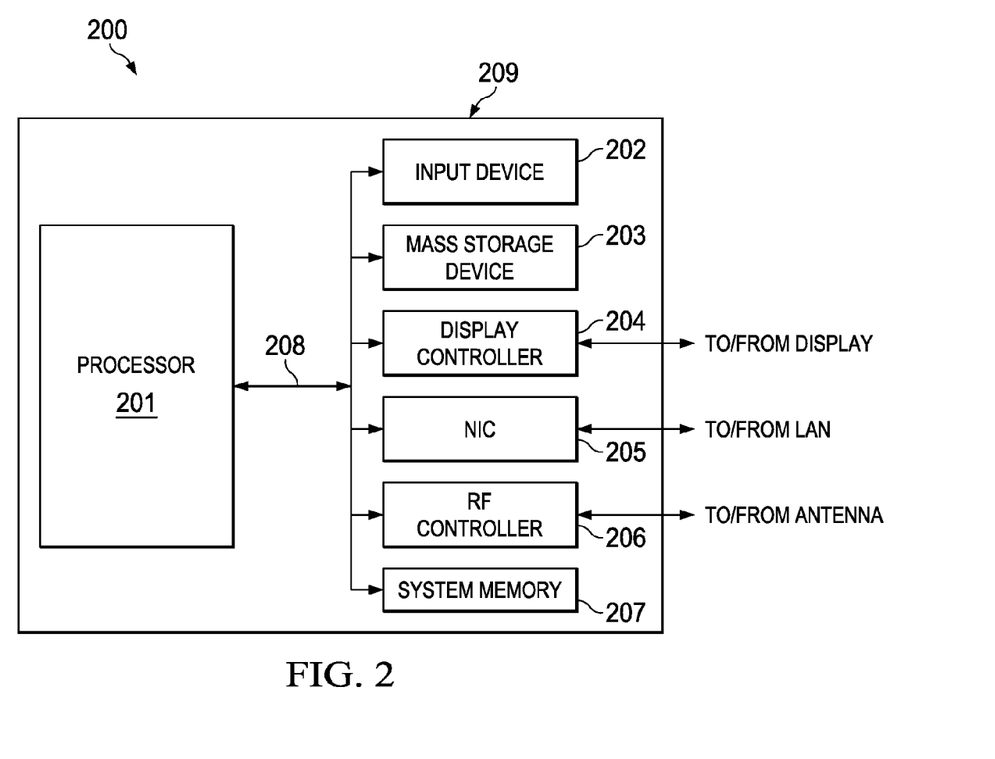
FIG. 2 is a block diagram illustrating an example of an IoT device that can be made secure through the use of an out-of-band beacon according to some embodiments.

FIG. 2 is a block diagram illustrating an example of IoT device 200 made secure through the use of out-of-band beacon 114. In to some embodiments, IoT device 200 may implement gateway 102, as well as any of IoT devices 104, 106, 108, and 116. IHS 100 and device 110 may be similarly implemented (with the exception of RF controller 206).

As shown, IoT device 200 includes processor 201, which is connected to bus 208. Bus 208 serves as a connection between processor 201 and other components of IoT device 200. Input device 202 is coupled to processor 201 to provide input to processor 201. Examples of input devices may include keyboards, touchscreens, pointing devices such as mice, trackballs, and trackpads, and/or a variety of other input devices. Programs and data are stored on mass storage device 203, which is coupled to processor 201. Examples of mass storage devices may include hard discs, optical disks, magneto-optical discs, solid-state storage devices, and/or a variety other mass storage devices.

IoT device 200 may also include a display (e.g., an LCD, etc.), which may be coupled to processor 201 via display controller 204. System memory 207 is coupled to processor 201 to provide it with fast storage to facilitate execution of computer programs by processor 201. Examples of system memory 207 may include random access memory (RAM) devices such as dynamic RAM (DRAM), synchronous DRAM (SDRAM), solid state memory devices, and/or a variety of other memory devices.

IoT device 200 may further include a network interface card or NIC 205 configured to provide IoT device 200 with access to LAN 113. As such, NIC 205 may include an Ethernet controller or the like, as well as any communication interface, wired or wireless, that can be used to communicate over LAN 113. RF controller 206 is coupled to an RF antenna, and it may include any RF transceiver capable of transmitting out-of-band beacon 114, in some cases, with a selectable output power adjustment.

In various embodiments, chassis 209 houses some or all of the components of IoT device 200. It should be understood that other buses and intermediate circuits (e.g., a Platform Controller Hub or PCH) may be deployed between the components described above and processor 201 to facilitate interconnection between those components and processor 201.

Figure 3:
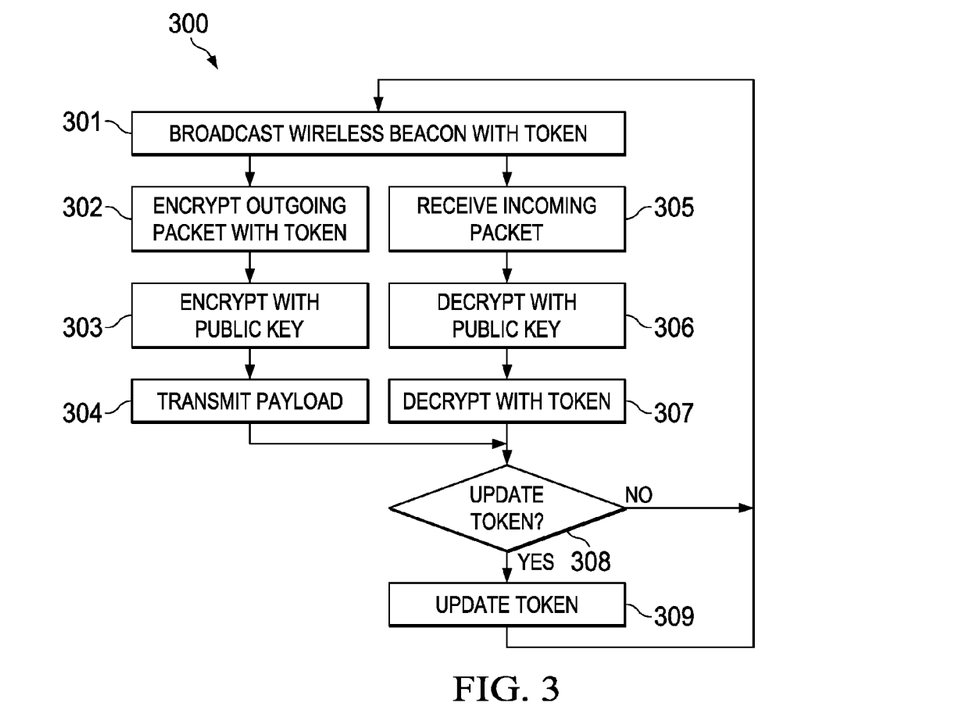
FIG. 3 is a flowchart illustrating an example of a method, performed by a gateway, for transmitting an out-of-band beacon and processing in-band communications according to some embodiments.

FIG. 3 is a flowchart illustrating an example of method 300, performed by gateway 102, for transmitting out-of-band beacon 114 and also processing in-band communications with IoT device 104 over LAN 113 according to some embodiments. At block 301, gateway 102 transmits out-of-band wireless beacon 114 containing a token, for example, using RF controller 206 of FIG. 2. In some cases, the token may be encrypted with the IoT device 104's public key, as determined by certificate 111. Also, the out-of-band beacon 114 may be transmitted constantly or periodically.

Blocks 302-304 describe the processing of in-band packets originated by gateway 102 and transmitted to IoT device 104, while blocks 305-307 show the processing of in-band packets originated by IoT device 104 and received by gateway 102—typically using NIC 205 of FIG. 2 over LAN 113 of FIG. 1.

On the transmit side, at block 302, gateway 102 encrypts an outgoing packet using the token. Any suitable encryption technique may be used. At block 303, gateway 102 encrypts the result of block 302 with IoT device 104's public key, again, as determined by certificate 111. And again, any suitable encryption technique may be used. Then, at block 304, gateway 102 transmits the resulting payload to IoT device 104 via LAN 113.

On the receive side, at block 305, gateway 102 receives an incoming packet originated by IoT device 104 over LAN 113. At block 306, gateway 102 decrypts the incoming packet with IoT device 104's public key, as determined by certificate 111. Any suitable decryption technique may be used. Then, at block 307, gateway 102 decrypts the result of block 306 with the token. Again, any suitable decryption technique may be used.

After blocks 304 and/or 307, control passes to block 308. At block 308, gateway 102 determines whether the current token should be rotated. For example, gateway 102 may include a policy that dictates a period of time after which the token should be changed. If the token should be rotated, then a new token is generated (e.g., using any suitable random seed or number generator or the like) and updated at block 309. Conversely, if the current token is still valid, no update is necessary and control returns to block 301.

In some embodiments, if the decrypted communications resulting from block 307 is not understood by gateway 102, gateway 102 may not be able to read the data at all because it may try to decipher the packets with the known token and/or PKI certificate. Because devices 110, 116, 108 do not have the token, the data is completely scrambled after it is put through the decipher algorithm. In these cases, gateway 102 cannot do anything with the packets received from those devices.

Additionally or alternatively, if the decrypted communications resulting from block 307 is not understood by gateway 102, or if decryption is not possible, gateway 102 may mark the IoT device that is the source of the incoming packet (e.g., devices 110 or 116, which cannot receive out-of-band wireless beacon 114 containing a token; or device 108, which has the wrong PKI certificate) received at block 305 as suspicious, or it may block further communications with that IoT device.

In various implementations gateway 102 may continue to use the immediately preceding token at block 307, even after the update of block 309, in order to cover scenarios, for example, where a legitimate IoT device (e.g., devices 104 or 106) transmits a packet right before it can receive or process an updated out-of-band beacon. In some implementations, if an encrypted packet is received at block 305 within a selected time window from update 304, block 307 may decrypt the result of block 306 with either the updated token or the immediately preceding token. After the selected time window, only the updated token is used and use of any outdated token may be considered indicative of an intrusion or security problem.

Figure 4:
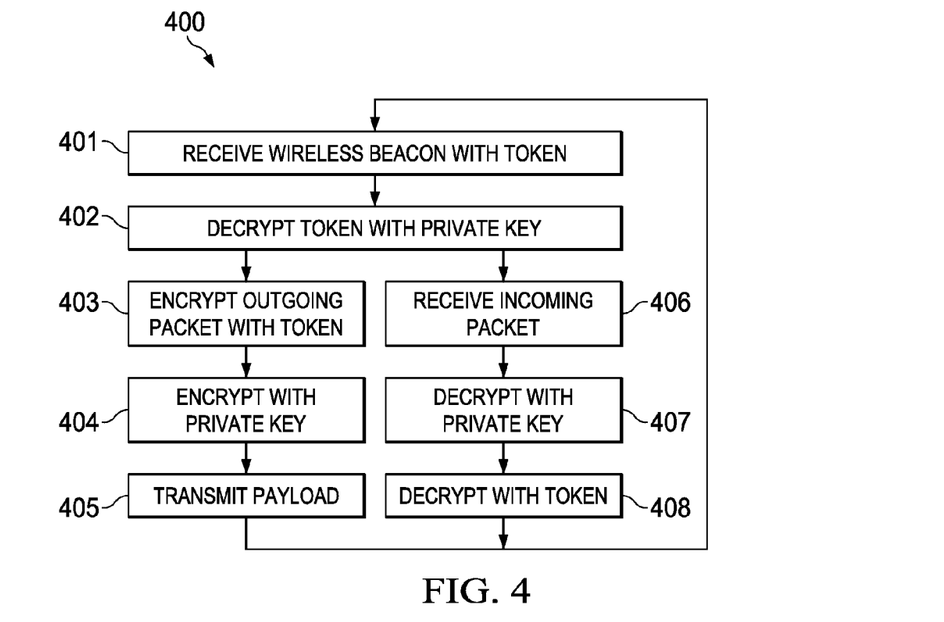
FIG. 4 is a flowchart illustrating an example of a method, performed by an IoT device, for receiving an out-of-band beacon and processing in-band communications according to some embodiments.

FIG. 4 is a flowchart illustrating example of method 400, performed by IoT device 104, for receiving out-of-band beacon 114 and also processing in-band communications with gateway 102 over LAN 113 according to some embodiments. At block 401, IoT device 104 receives out-of-band beacon 114 with a token, for example, using RF controller 206 of FIG. 2. If the token is encrypted, at block 402, IoT device 104 decrypts the token using its private key, as determined by certificate 111.

Blocks 403-405 describe the processing of in-band packets originated by IoT device 104 and transmitted to gateway 102 (or IoT device 106), while blocks 406-408 show the processing of in-band packets originated by gateway 102 (or IoT device 106) and received by IoT device 104—typically using NIC 205 of FIG. 2 over LAN 113 of FIG. 1.

On the transmit side, at block 403, IoT device 104 encrypts an outgoing packet with the token. Any suitable encryption technique may be used. At block 404, IoT device 104 encrypts the result of block 403 with the IoT device 104's private key, again, as determined by certificate 111. And again, any suitable encryption technique may be used. Then, at block 405, IoT device 104 transmits the resulting payload to gateway 102 (or IoT device 106) via LAN 113.

On the receive side, at block 406, IoT device 102 receives an incoming packet from gateway 102 over LAN 113. At block 407, IoT device 104 decrypts the received packet using its private key, as determined by certificate 111. Any suitable decryption technique may be used. Then, at block 408, IoT device 104 decrypts the result of block 407 with the token. Again, any suitable encryption technique may be used.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes may be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises"

and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
broadcasting, by a gateway, a wireless beacon that is out-of-band with respect to communications between the gateway and a plurality of devices over a network, wherein the wireless beacon includes a token;
receiving an encrypted packet at the gateway as part of the communications;
decrypting the encrypted packet into an intermediate payload by the gateway using a public key, wherein the public key corresponds to a certificate provisioned to each of the plurality of devices;
decrypting the intermediate payload into a decrypted packet by the gateway using the token;
after a selected amount of time, broadcasting, by the gateway, another wireless beacon that is out-of-band with respect to the communications, the other wireless beacon including a different token;
receiving another encrypted packet at the gateway as part of the communications;
decrypting the other encrypted packet into another intermediate payload by the gateway using the public key; and
in response to being unable to decrypt the other intermediate payload with the different token, marking a source of the other encrypted packet as suspicious or blocking further communications with the source.

2. The method of claim 1, wherein the communications include Internet Protocol (IP) communications, and wherein the encrypted packet includes an encrypted IP packet.

3. The method of claim 1, wherein transmitting the wireless beacon includes using a Radio Frequency (RF) transceiver that is distinct from another transceiver used in the communications.

4. The method of claim 1, wherein the wireless beacon has a range that is shorter than a communication range of the network.

5. The method of claim 1, wherein the token is encrypted by the gateway using the public key prior to the broadcasting of the beacon.

6. The method of claim 1, further comprising:
after a selected amount of time, broadcasting, by the gateway, another wireless beacon that is out-of-band with respect to the communications, the other wireless beacon including a different token;
receiving yet another encrypted packet at the gateway as part of the communications;
decrypting the yet another encrypted packet into yet another intermediate payload by the gateway using the public key; and
decrypting the yet another intermediate payload into yet another decrypted packet by the gateway using the different token.

7. The method of claim 1, further comprising:
transmitting, by the gateway as part of the communications over the network, packets encrypted with both the token and the public key.

8. A device, comprising:
a processor; and
a memory coupled to the processor, the memory having program instructions stored thereon that, upon execution by the processor, cause the device to:
receive a wireless beacon that is out-of-band with respect to communications between a gateway and a plurality of devices over a network, wherein the wireless beacon includes a token;
encrypt an outgoing packet using the token into an intermediate payload;
encrypt the intermediate payload into an encrypted packet using a private key, wherein the private key corresponds to a certificate provisioned to each of the plurality of devices;
transmit the encrypted packet to the gateway over the network;
receive another wireless beacon that is out-of-band with respect to the communications between the gateway and the plurality of devices over the network, wherein the other wireless beacon includes a different token;
encrypt another outgoing packet using the different token into another intermediate payload;
encrypt the other intermediate payload using the private key into another encrypted packet; and
transmit the other encrypted packet to the gateway over the network.

9. The device of claim 8, wherein the communications include Internet Protocol (IP) communications, and wherein the encrypted packet includes an encrypted IP packet.

10. The device of claim 8, wherein receiving the wireless beacon includes using a Radio Frequency (RF) transceiver that is physically distinct from another transceiver used in the communications.

11. The device of claim 8, wherein the wireless beacon has a range that is shorter than a communication range of the network.

12. The device of claim 8, wherein the token within the wireless beacon is encrypted with a public key corresponding to the private key, and wherein the program instructions, upon execution by the processor, further cause the device to decrypt the token with the private key.

13. The device of claim 8, wherein the program instructions, upon execution by the processor, further cause the device to:
receive yet another encrypted packet from the gateway;
decrypt the yet another encrypted packet into yet another intermediate payload using the private key; and
decrypt the yet another intermediate payload into yet another decrypted packet using the token.

14. A memory device having program instructions stored thereon that, upon execution by a processor of a gateway, cause the gateway to:
broadcast a wireless beacon that is out-of-band with respect to communications between the gateway and a plurality of devices over a network, wherein the wireless beacon includes a first token;
receive an encrypted packet as part of the communications;
decrypt the encrypted packet into an intermediate payload using a public key, wherein the public key corresponds to a certificate provisioned to each of the plurality of devices;

decrypt the intermediate payload into a decrypted packet using the first token;

after a predetermined amount of time, broadcast another wireless beacon that is out-of-band with respect to the communications, the other wireless beacon including a second token;

receive another encrypted packet at the gateway as part of the communications;

decrypt the other encrypted packet into another intermediate payload by the gateway using the public key; and in response to the other encrypted packet having been received within a selected time window from the predetermined amount of time, decrypt the other intermediate payload with any of the first token or the second token.

15. The memory device of claim 14, wherein the program instructions, upon execution by the processor, further cause the gateway to:

in response to the other encrypted packet having been received outside of a selected time window from the predetermined amount of time, decrypt the other intermediate payload with the second token.

16. The memory device of claim 14, wherein the program instructions, upon execution by the processor, further cause the gateway to:

in response to: (1) the other encrypted packet having been received outside of a selected time window from the predetermined amount of time, and (2) the other intermediate payload having been encrypted with the first token, mark a source of the other encrypted packet as suspicious or block further communications with the source.

* * * * *